Sept. 23, 1958  J. E. SKUTNIK  2,853,332
THIEFPROOF AUTOMOBILE DOOR PUSH BUTTON
Filed Nov. 4, 1957

INVENTOR.
BY
John E. Skutnik

United States Patent Office 2,853,332
Patented Sept. 23, 1958

2,853,332

THIEFPROOF AUTOMOBILE DOOR PUSH BUTTON

John E. Skutnik, Hamtramck, Mich.

Application November 4, 1957, Serial No. 694,390

3 Claims. (Cl. 292—347)

This application relates to a thiefproof push button for automobile doors, particularly adapted for hard-top and convertible vehicles, which are extremely vulnerable to automobile thieves.

Since the advent of the hard-top automobile it has been a comparatively simple matter for someone to gain entrance into a locked automobile by merely inserting some instrument such as an icepick, screwdriver or bent wire, through the weatherstrip or the window vent and lifting upward the conventional push-pull button disposed in the horizontal window rail, which in turn actuates the locking mechanism and unlocks the door.

This invention will appear more clearly from the following detailed description when taken in connection with the accompanying drawings, showing by way of example a preferred embodiment of the inventive idea.

Figure 1:
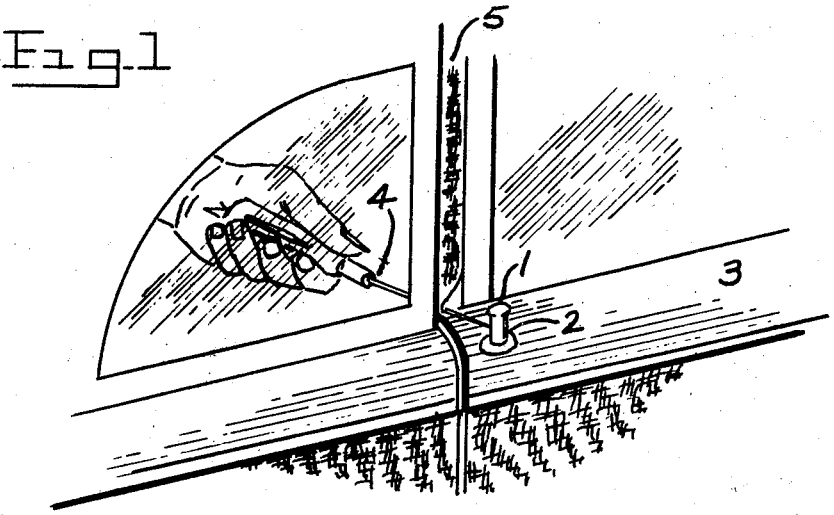
Figure 1 is a perspective view (interior) of a hard-top automobile door, the latch operating conventionally by depression of push-pull button protruding from the door edge adjacent the automobile window, and conversely the push-pull being pulled up to unlatch door.

This application specifically discloses a novel form of replacement push button to replace the ones presently used and prevent auto thieves from gaining easy entrance into locked automobiles.

Referring now to the drawings:

Figure 1 shows commonly used method of automobile thieves to gain illegal entry into automobile by lifting conventional push-pull button vertically disposed in opening 2 of horizontal window rail 3 using an instrument 4 forced alongside of weatherstrip 5 (or through side vent on automobiles having button there) to lift up conventional push-pull button 1 which is screwed to the threaded rod shank, this actuates the door lock and subsequently opens locked automobile door.

Figure 2:
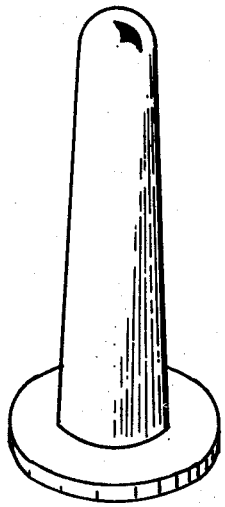
Figure 2 is a perspective view of my invention of a thiefproof push button.

Figure 2 is a perspective view of the thiefproof push button. It can be manufactured of plastic, composition or metal. The annular head and cylindrical body can be of any shape. Various modifications may be made in the construction and use thereof within the scope of the subsequently claimed invention which is to be construed broadly and limited only by prior art.

Figure 3:
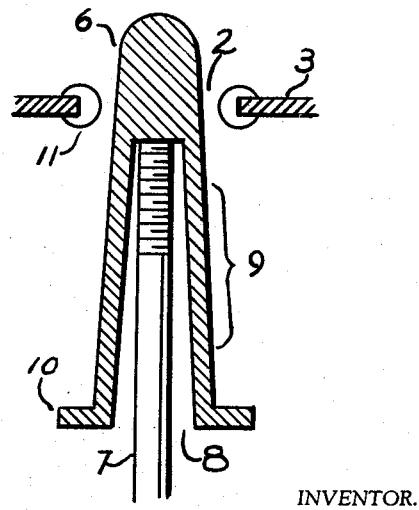
Figure 3 is a vertical section view of the thiefproof push button in the depressed, locked position.

Figure 3 shows a sectional view of the thiefproof button in the depressed (locked) position. The push button 6 slides freely over the rod shank 7. When the automobile is locked using key, the rod shank 7 is pulled down by the locking action of the key. The push button 6 slides down with the rod shank due to the free sliding action of the larger diameter bore 8 which does not engage the rod shank 7 in any way. The purpose of the upward taper 9 serves to glance off or deflect the action of any instrument used in an attempt to pry upward on said push button. Should a thief manage to jab the push button (not possible with a metal button) using an ice pick and lift upward, the push button will raise to its travel limit until flange 10 abuts against grommet 11 of opening 2 of horizontal rail 3, however, rod shank 7 would continue to remain depressed and the door would remain locked. The pull-up feature of the conventional push-pull button is nullified. The raised or depressed position will indicate whether door is locked or unlocked. Doors are locked from inside of the car by depressing push button or from outside by using key or by holding down push button while working door handle and slamming doors as in General Motors' cars.

I claim:

1. A thiefproof push button means for automobile vehicle doors in combination with a lock operating rod of the type having a vertical rod protruding through an aperture in the window rail, comprising a hollow substantially rigid tubular body vertically disposed having a vertically diminishing outer diameter, larger at the bottom and smaller at the top ending in a peripheral head, the bottom comprising a flared shoulder of larger diameter than said tubular body adapted to abut against the inside of the window rail to delimit upward travel, the internal bore having an inner diameter greater than the diameter of the lock operating rod so as to slide freely upon it.

2. A thiefproof automobile push button in combination with a lock operating rod of the type having a vertical rod shank extending partly through an opening in the horizontal window sill comprising an elongated body section axially bored and having an external taper larger at the bottom and gradually reduced towards the top terminating in a rounded head closed at the top, the lower end flared outward to form a substantially larger flange at the bottom, larger than the opening in the horizontal window sill, adapted to act as a stop limit against the under side of the said horizontal window rail, the vertical rod shank sliding freely in the hollow body section, which is substantially of greater diameter than said rod shank, so that any lifting action on the body section will in no way cause the rod shank to lift to actuate lock mechanism.

3. A thiefproof locking means for an automobile door of the type having a locking rod shank extending through an aperture in the horizontal window rail, said rod shank adapted to be pushed down to lock the door, comprised of an elongated tubular section internally bored through its axis with an opening at the bottom and closed at the top, the bore of substantially larger diameter than rod shank, the external diameter of the tubular section tapered diminishing towards the top and ending in a dome shaped head, the opposite end of tubular body flared out to form a flange of substantially larger diameter than body to act as travel stop against underside of window rail to delimit travel.

References Cited in the file of this patent

UNITED STATES PATENTS

| | | |
|---|---|---|
| 2,708,845 | Trammell | May 24, 1955 |
| 2,735,289 | Trammell | Feb. 21, 1956 |
| 2,768,854 | Wasserman | Oct. 30, 1956 |
| 2,781,220 | Zietlow | Feb. 12, 1957 |